United States Patent [19]

Rejc

[11] Patent Number: 4,853,531

[45] Date of Patent: Aug. 1, 1989

[54] APPARATUS FOR CONTROLLNG THE OPENING AND/OR CLOSING OF HIGH-SPEED SHUTTER DOORS

[75] Inventor: Gabriel Rejc, Landshut, Fed. Rep. of Germany

[73] Assignee: Efaflex Transport und Lagertechnik GmbH, Bruckberg-Edlkofen, Fed. Rep. of Germany

[21] Appl. No.: 12,247

[22] Filed: Feb. 9, 1987

[30] Foreign Application Priority Data

Feb. 7, 1986 [DE] Fed. Rep. of Germany ....... 3603940

[51] Int. Cl.[4] .............................................. G01V 9/04

[52] U.S. Cl. ................................ 250/221; 250/222.1; 340/556

[58] Field of Search .................... 250/221, 222.1, 57.3; 340/555-557, 630

[56] References Cited

U.S. PATENT DOCUMENTS

| | | | |
|---|---|---|---|
| Re. 30,719 | 8/1981 | Mills | 187/52 R |
| 3,370,284 | 2/1968 | Bagno | 250/221 |
| 3,739,372 | 6/1973 | Schlisser et al. | 340/556 |
| 3,805,061 | 4/1974 | DeMissimy et al. | 250/209 |
| 3,852,592 | 12/1974 | Scoville et al. | 250/221 |
| 3,970,846 | 7/1976 | Schofield et al. | 250/221 |
| 4,247,767 | 1/1981 | O'Brien et al. | 250/221 |
| 4,266,124 | 5/1981 | Weber et al. | 250/221 |
| 4,310,756 | 1/1982 | Sick et al. | 250/221 |
| 4,514,625 | 4/1985 | Heiland | 340/556 |
| 4,520,262 | 5/1985 | Denton | 250/221 |
| 4,645,920 | 2/1987 | Carroll et al. | 250/221 |
| 4,794,248 | 12/1988 | Gray | 250/221 |

FOREIGN PATENT DOCUMENTS

| | | |
|---|---|---|
| 2493277 | 11/1978 | Australia . |
| 0144882 | 6/1985 | European Pat. Off. . |
| 2451100 | 5/1975 | Fed. Rep. of Germany . |
| 2540741 | 3/1977 | Fed. Rep. of Germany . |
| 2648631 | 5/1978 | Fed. Rep. of Germany . |
| 2851444 | 5/1978 | Fed. Rep. of Germany . |
| 3021363 | 12/1981 | Fed. Rep. of Germany . |
| 8202787 | 8/1982 | PCT Int'l Appl. . |
| 1404913 | 9/1975 | United Kingdom . |

*Primary Examiner*—David C. Nelms
*Assistant Examiner*—Stephone B. Allen
*Attorney, Agent, or Firm*—Thomas R. Vigil

[57] ABSTRACT

The apparatus is utilized to detect disturbance created in an opening by objects even when the objects do not move so that they cannot be detected by a motion detector. The apparatus includes a transmitter-receiver apparatus provided at the opening comprising a plurality of arrays, each of which comprises a receiver and a plurality of transmitters. Because divergent beams are emitted by the transmitters, which preferably consist of infrared-emitting diodes, the transmitters and the associated receiver can be arranged to define a triangle in space so that the space of the opening can be completely covered by a plurality of transmitter-receiver arrays. By means of a cyclic signal sequence it is ensured that a signal which has been transmitted is checked in the receiver whether it belongs to the correct transmitter. In order to ensure that high-speed folding shutter doors which are being closed or opened will be controlled so that they move into undisturbed areas, the space in which the movement of the high-speed doors is effected must be protected so timely that an impact on an object protruding into the region of the opening will be prevented in time. For this reason an evaluation signal generated by a control circuit is utilized to operate the door drive in time.

46 Claims, 5 Drawing Sheets

APPARATUS FOR CONTROLLNG THE OPENING AND/OR CLOSING OF HIGH-SPEED SHUTTER DOORS

BACKGROUND AND SUMMARY OF THE INVENTION

This invention relates to apparatus for controlling the opening and closing of high-speed shutter doors by detecting the presence or absence of an object in a space.

Such apparatus are constituted, e.g., by photoelectric barriers, which comprise a light source as a transmitter and a photodetector as a receiver and in which the light beam is a continuous signal that is emitted by the transmitter and reaches the receiver directly or after a deflecting reflection. Such systems comprising a transmitter and a receiver are usually described as photoelectric barriers and are relatively expensive and bulky. A transmitter and a receiver are associated with each line to be watched. Their large bulk is particularly due to the fact that in most photoelectric barriers the light source emits light in the visible spectral range and light which is emitted by extraneous sources also in the visible spectral range may be superposed on the light used in the barrier. For this reason the light source must have a particularly high signal amplitude so that a superposition of light from other light sources will be avoided as far as possible. Particularly in interior rooms, such photoelectric barrier can be more easily implemented because light, e.g., from the sun, will not effect a false response of the photoelectric barrier. Where relatively large areas must be watched, a plurality of photoelectric barriers will be required and in most cases will involve high costs of an order of many thousands of deutschmarks and will require intense maintenance.

Apparatus used outdoors or on external walls preferably comprise a detector which is responsive to ultrasonic energy or operates-like a radar. Such detector will not be affected by disturbing light, as is the case with photoelectric detectors. But such detectors have the disadvantage that only moving object can be detected in the area to be watched. If an extraneous object enters into the area to be watched and said object remains in that area without moving, it will not be possible to detect whether the object which has entered is still within the area to be watched or has left that area.

For instance, in the operation of high-speed folding shutter doors it is important to detect whether a vehicle which has passed through the door opening or a person who has entered that area is still partly or entirely in the range of the pivotal movement of the folding doors after some time. Because this cannot be detected by motion detectors, other detectors must be provided if injury to persons and damage to objects and folding shutter doors by the impact of the folding shutter door on persons or objects in the range of movement of the folding shutter door during its opening and closing movement is to be avoided.

That problem is conventionally solved by the provision of rubber bars on the end edges of the folding shutter doors. Said rubber bars are designed to constitute touch detectors, e.g., because they contain an air chamber which in response to pressure applied to the rubber bar delivers a signal through a suitable connecting hose to a switching diaphragm. But such an arrangement has the great disadvantage that the disturbance-indicating signal will be initiated only when an object has impinged on the rubber bar and that the drive means for the folding door wing will be stopped only after a relatively long delay so that damage and particularly injury to persons cannot reliably be avoided particularly in the control of high-speed doors.

Because that problem cannot be solved even by motion detectors, only photoelectric barriers can be used and owing to the influence of daylight they must have light sources having a particularly high luminous intensity with very high signal amplitudes so that the light sources are expensive. For instance, for a detection also of a stretched-out hand of a person or a drawbar of a vehicle or a fork of a fork lift truck or the like, i.e., a horizontal object which is parallel to the floor plane and may be arranged on any of various levels, it will be necessary to provide a plurality of photoelectric barriers and owing to the overall height of such barriers they must be spaced at least a certain distance apart so that objects extending into the space between the light beams of two photoelectric barriers cannot be detected. If such a plurality of photoelectric barriers are used even though they completely watch the desired area, the resulting systems will cost many thousands of deutschmarks.

For this reason it is an object of the invention to provide apparatus by which a plane and/or a small-depth space, such as an opening in a building, can be watched almost in its entirety and even when an object which is disposed in said plane or opening does not move.

A particularly important advantage afforded by the teaching of the invention resides in that the surface or space to be watched can be watched virtually in its entirety because a plurality of transmitters, which may be relatively small, transmit signals to a single receiver. If the transmitters of said plurality are activated in alternation, e.g., in a cyclic sequence, the location of the disturbance within the opening to be watched can be determined by means of an evaluating circuit which is connected to the receiver. The receiver need not be particularly expensive because it need not distinguish between signals coming from a plurality of transmitters at the same but must check only whether a signal is being received from a given transmitter. In the simplest case that signal is a light signal having a defined length or duration so that it is sufficient for the receiver to check the amplitude and duration of the signal. This means that the signals to be transmitted are generated at a certain clock frequency and will activate the various transmitters in a cyclic sequence and on the receiving side can be checked by the common receiver and evaluated to detect a coincidence or deviation. Different from photoelectric barriers, there is no concentrated beam of light but divergent beams of light are used, which are emitted by a plurality of transmitters and are spread over the area in which the common receiver is located. To avoid any difficulties arising owing to the influence of disturbing light, it is preferred to use a transmitter consisting of an infrared-emitting diode and a receiver consisting of an infrared detector. It will be understood that polarized light sources and polarized light receivers can be used too.

For the surveillance of relatively large areas or spaces it will be necessary to provide a plurality of arrays each of which consists of a plurality of transmitters and one associated receiver. It has been found that triangular configurations are particularly desirable. For instance, a rectangular area may be covered by two mutually opposite arrays, one of which covers one and the other of which covers the other of the triangles which together constitute the rectangular area. For the surveillance of relatively high openings, a plurality of such arrays may be required on both sides of the opening if the space is to be watched on all levels. In that case a particularly great advantage afforded by the invention will reside in that complicated systems will not be required but a large number of, e.g., infrared-emitting diodes may be mounted on a bar on which a receiver belonging to the opposite array is interposed between groups of transmitters.

It will be understood that such bar assemblies can be mounted on stationary as well as on movable objects, such as high-speed folding shutter doors. Owing to the favorable design such bars may also be mounted on jambs or on floor surfaces so that it will be possible to watch not only area but by means of the bars and their surfaces in combination to watch also spaces. This ability may be used particularly with high-speed folding shutter doors for a complete surveillance of the space in which such doors move as they are opened.

The surveillance is so sensitive that even gaseous disturbances entering the space being watched, such as billows of smoke, exhaust gases and the like, may initiate a closing of a high-speed door so that such gases cannot enter the space behind such door.

An illustrative embodiment of the invention will now be described in more detail.

DESCRIPTION OF THE PREFERRED EMBODIMENT

Figure 1:
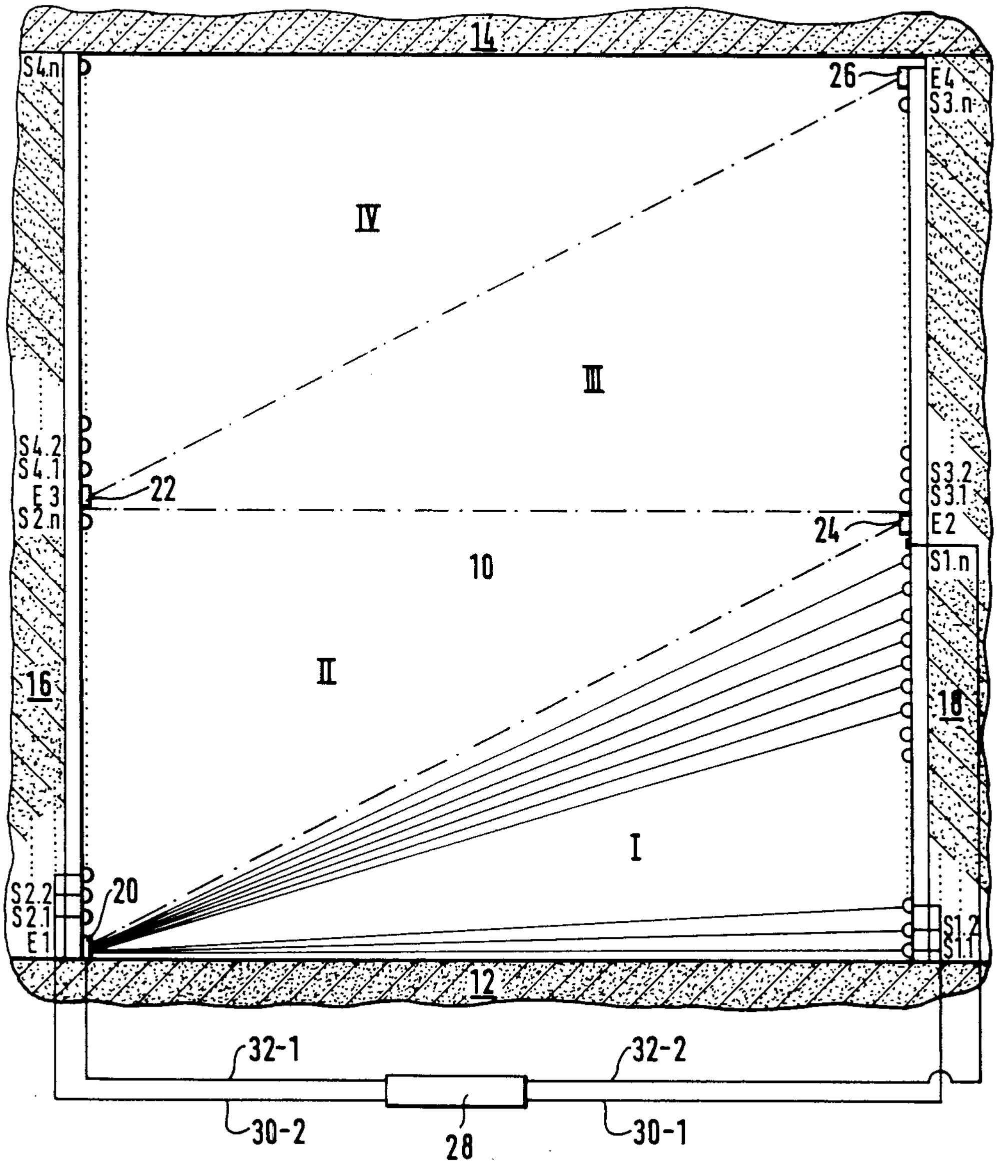
FIG. 1 shows a system configuration.

In accordance with FIG. 1 an opening 10 is defined in a building by a floor plane 12, a ceiling plane 14, a left-hand wall 16 and a right-hand wall 18. Receivers 20 and 22 are mounted on the left-hand wall 16 and receivers 24 and 26 are mounted on the right-hand wall 18. Transmitters S1.1 to S1.n are mounted on the right-hand wall 18 opposite to the first receiver 20 of the left-hand wall. The transmitters S2.1, S2.2 to S2.n are mounted on the left-hand wall 16 and are associated with the second receiver 24 on the right-hand wall 18. Similar remarks are applicable to the third receiver 22 on the left-hand wall 16 and the associated transmitters S3.1, S3.2 to S3.n on the right-hand wall 18, and to the fourth receiver 26, which is mounted on the right-hand wall 18, and the associated transmitters S4.1, S4.2 to S4.n on the left-hand wall 16. The first receiver 20 and the transmitters S1.1, S1.2 to S1.n define a triangular area I, in which a right angle is included between the side wall 18 and the floor 12. The second receiver 24 and the transmitters S2.1 to S2.n define also the area of a right triangle, which has a hypotenuse in common with the triangular area I. A triangular area III is defined by the array consisting of the third receiver 22 and the associated transmitters S3.1 to S3.n and is spatially offset from the triangular area I by one-half of the height of the opening 10. A triangular area IV is defined by the fourth receiver 26 and the associated transmitters S4.1 to S4.n and is equivalent to the triangular area II and is upwardly offset from it also by one-half of the height of the opening. The four triangular areas I to IV ensure a complete coverage of the opening 10.

The transmitters S.1 to S1.n consist of infrared-emitting diodes and have a divergence angle of at least 20°. As a result, the triangular area I is entirely covered by the infrared beams which are emitted by said infrared diodes and all beams can be received by the first receiver 20. It will be understood that the third receiver 22 could also receive infrared beams from the infrared-emitting diodes S1.1 to S1.n but this would involve a different group circuitry with a corresponding evaluation, as will be described more exactly hereinafter.

A control circuit 28 supplies power via a transmitter line 30-1 to the transmitters of the first array and via a transmitter line 30-2 to the transmitters of the second array. Corresponding transmitter lines not shown in detail supply power to the transmitters of arrays three and four, respectively. The first receiver 20 is connected to the control circuit 28 by a receiver line 32-1. The second receiver 24 is connected to the control circuit 28 by a second line 32-2. The third receiver 22 and the fourth receiver 26 are connected to the control circuit 28 by similar means which are not shown.

Figure 2:
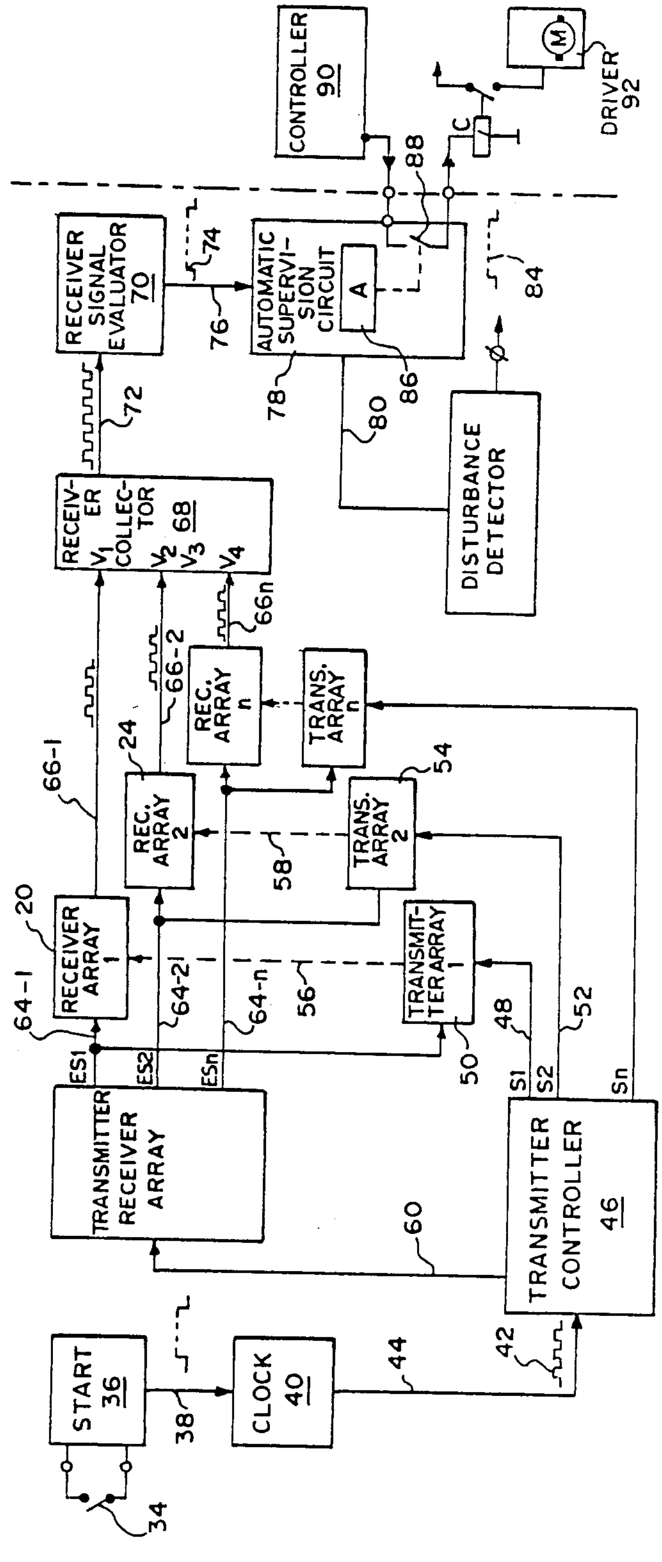
FIG. 2 is a block circuit diagram of the invention.
Figure 3:
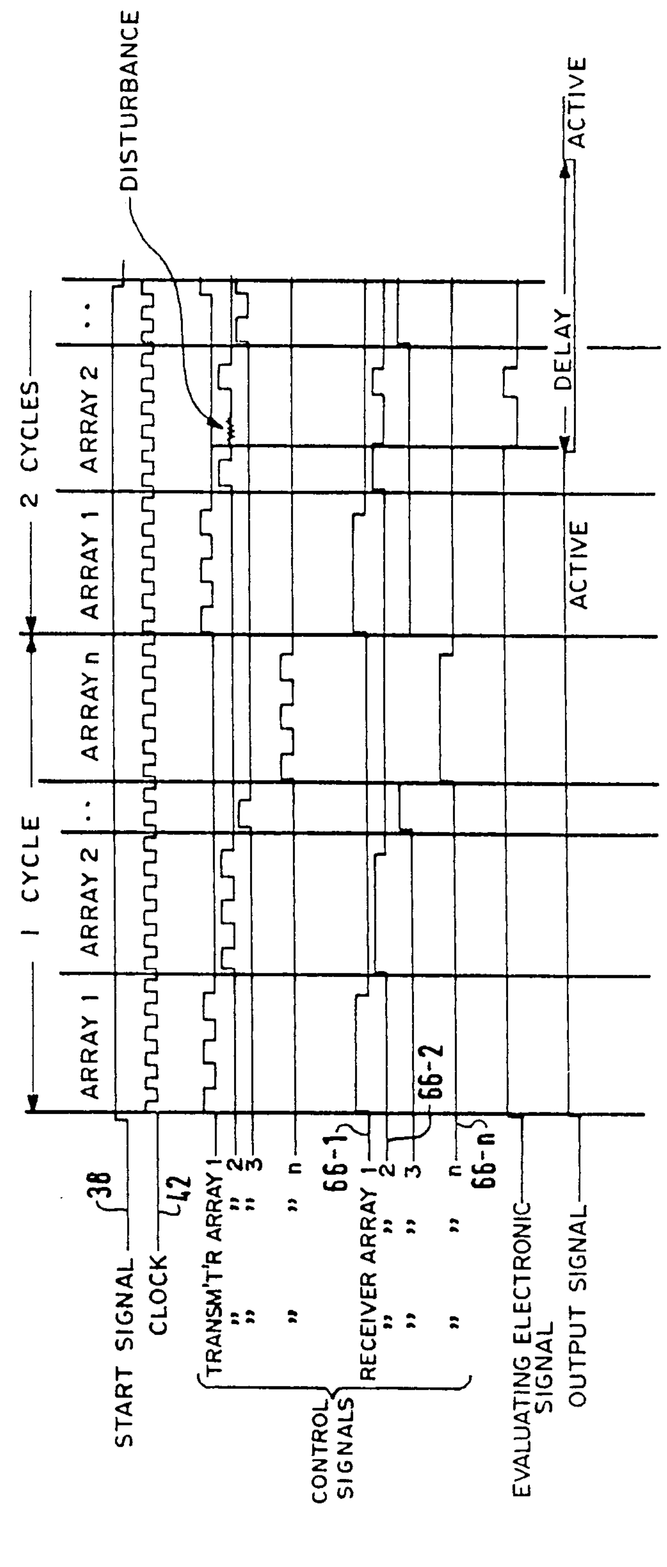
FIG. 3 is a waveform diagram illustrating the various signals.

The control circuit 28 is shown in more detail in FIG. 2. By means of a master switch 34, a signal generator 36 is activated to generate a start signal 28, which is delivered to a clock 40, which generates a clock signal 42 consisting of a train of square pulses. The clock signal 42 coming from the clock 40 is delivered by a clock line 44 to a transmitter controller 46, which delivers transmitter signals S1 via a first transmitter signal line to the transmitters of a first group 50. The transmitter controller 46 also delivers transmitter signals S2 via a second line 52 to the transmitters of a second group 54. Additional lines extending from the transmitter controller deliver corresponding transmitter signals to the transmitters of additional groups in dependence on the number of transmitter groups which are connected. In the embodiment shown in FIG. 1, four transmitter lines lead to four groups of transmitters.

The signals 56 emitted by the transmitters of the first group 50 are received by the first receiver 20, which is associated with the first group. Signals emitted by the transmitters of the second group 54 are received by the second receiver 24, which is associated with the second group. Similar remarks are applicable to the groups of transmitters and to the receivers of the further arrays. Via a comparison signal line, the transmitter controller delivers comparison signals to a transmitter-receiver array distributor 62, which forward the comparison signals 64-1 to 64-n to the receivers associated with the respective groups. In each of the receivers 20, 24, etc. each comparison signal 64 is compared with the associated one of the signals 56, 58 etc. which have been emitted by the transmitters. That comparison may be effected, e.g., by a logical AND gate. The output signals 66-1 and 66-2 to 66-n are delivered to a receiver collector circuit 68 and from the latter on a collector line 72 to a common evaluating circuit for evaluating the receiver signals. The evaluation signal 74 is delivered to the evaluating circuit 70 via an evaluation signal line 76 of an automatic supervising circuit 78 which preferably consists of a fail-safe circuit. From that circuit, signals are delivered via a fault signal line 80 to a fault detector circuit 82, which delivers detection signals 84. The automatic supervising circuit 78 comprises a relay 86, which by its relay contact 88 comprises a relay 86, which by its relay contact 88 connects the controller 90 for the folding shutter door to the drive means 92 for the folding shutter door. The actuation of the relay contact 88 may also be used to generate a detection signal 84' and this might be used to actuate an alarm or other surveillance devices rather than the means for controlling a high-speed door.

Figure 4:
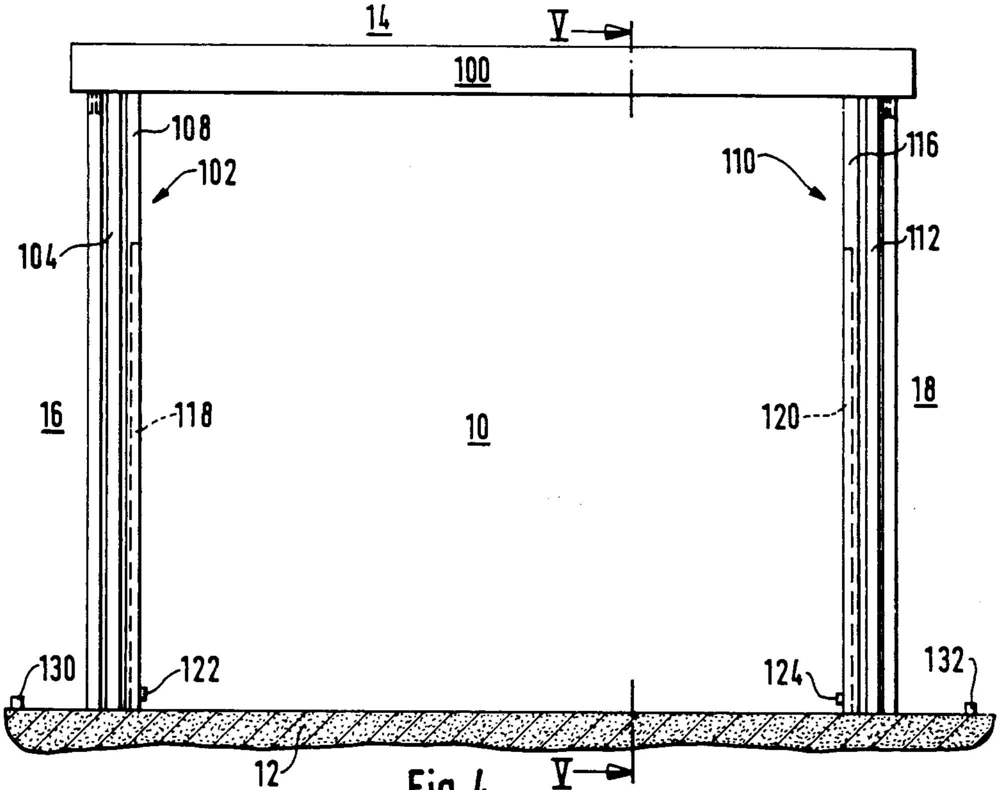
FIG. 4 is a front elevation showing a high-speed folding shutter door provided with bars in accordance with the invention.

The opening 10 of a building is shown in front elevation in FIG. 4 and is defined by an open folding shutter door on the left-hand side wall 16 and on the right-hand side wall 18. Suitable means 100 for guiding and driving are provided adjacent to the ceiling 14. The left-hand half 102 of the door consists of two door wings, namely, the drive wing 104 and the end wing 108. Similarly, the right-hand half 110 of the door consists also of a drive wing 112 and an end wing 116. The drive means and the means for guiding the several wings have been disclosed in German Patent Application No. P 32 14 834.

Figure 5:
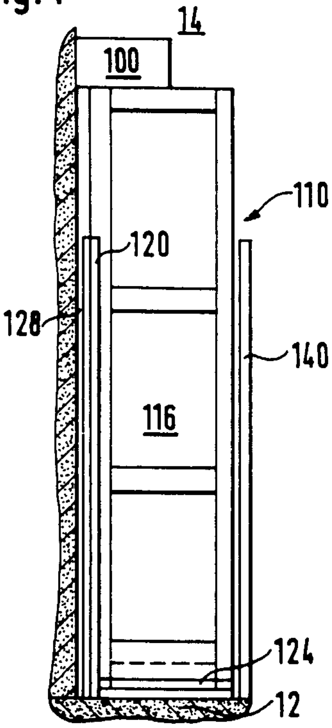
FIG. 5 is a sectional view taken on line IV—IV in FIG. 4.
Figure 6:
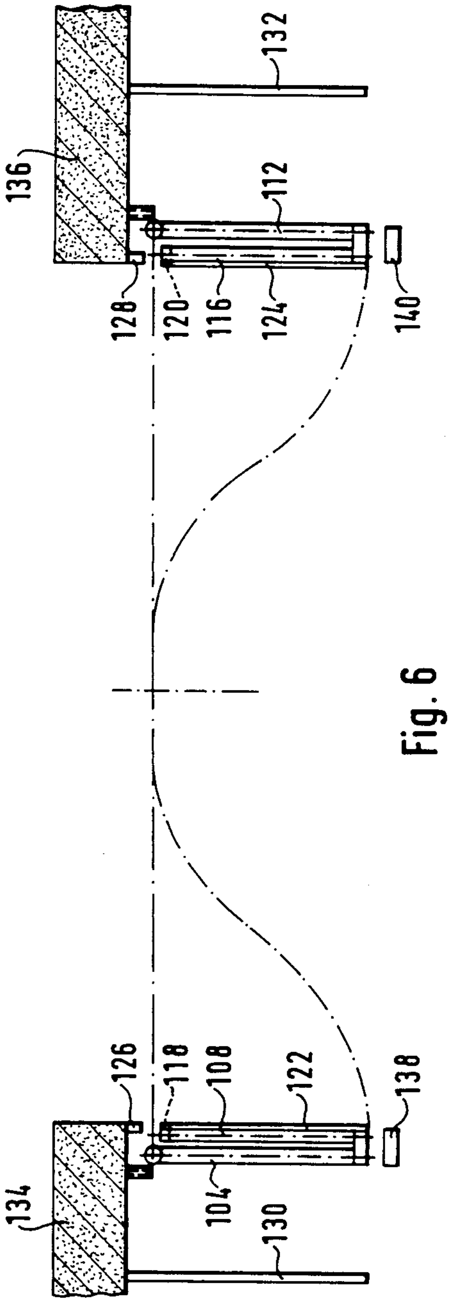
FIG. 6 is a diagrammatic top plan view showing the shutter door in an open state.

As is apparent from the side elevation in FIG. 5 and the top plan view in FIG. 6, a plurality of watching bars are provided, namely, vertical end wing bars 118 and 120, which are respectively provided on the left-hand end wing 108 and on the right-hand end wing 116. In the present example the vertical bars 118 and 120 extend only over the usual height of a person, amounting to about 2 meters, although it will be understood that it is possible also to watch the entire height of the shutter door. Adjacent to the lower end of the left-hand end wing 108, wing bottom bars 122 and 124 are respectively provided on the left-hand end wing 108 and on the right-hand end wing 116 near their lower ends. When the doors open, the vertical end wind bars 118 and 120 ensure a surveillance of the area of the door opening 10 and the wing bottom bars 122 and 124 provide for a surveillance of that area in a depth which corresponds to the width of the end wing 108 or 116. The space to be watched is defined on the building side of the opening by a left-hand jamb bar 126 and a right-hand jamb bar 128. As a result, the jamb bars 126 and 128 ensure a surveillance of an area which is U-shaped in cross-selection and disposed at the rear and the wing bottom bars 122 and 124 and the vertical end wing bars 118 and 120 provide for a surveillance on the front side when the door is open. During a closing of the door, the entire range in which the high-speed shutter door performs its pivotal movement in said area is watched.

In addition, a left-hand floor bar 130 and a right-hand floor bar 132 are provided, which are similar in function to the wing bottom bars 122 and 124, respectively The left-hand floor bar 130 extends from the left-hand wall 134 of the building at right angles to the wall 134 into the area to be watched, in which the door performs its motion. The left-hand floor bar 130 is preferably secured to the floor 12. The right-hand floor bar 132 is also secured to the floor and extends from the right-hand wall 136 of the building at right angles to the wall 136.

A left-hand upright bar 138 and a right-hand upright bar 140 are provided and are similar in function to the vertical end wing bars 118 and 120, respectively. This means that the upright bars 118 and 140 watch approximately the same plane as the wing end bars 118 and 120. Similarly, the floor plane in the opening is watched by the floor bars 130 and 132 when the door is closed or closing. When the door is open, the surveillance is effected by the wing bottom bars 122 and 124. As a result, the wing bars moving in unison with the door effect a surveillance in addition to that effected by the stationary floor, upright or jamb bars so that the outer space in which the movement takes place is covered by the stationary bars and the inner space in which the movement is effected is covered by the wing bars. Because the bars are substantially provided only with the infrared-emitting diodes and the infrared detectors whereas the control circuit 28 is preferably accommodated adjacent to the guiding and drive means 100, said bars may be very slender so that they need not be allowed for the design of the high-speed folding shutter doors. This will be particularly significant with doors having transparent plastic wings.

It will be obvious that a person skilled in the art can provide such surveillance bars in doors also in a different geometry, in dependence on the nature of the opening and closing functions to be provided for. This will be particularly possible when the various bar assemblies are incorporated in the entire array control in such a manner that disturbances which occur in one plane and do not yet affect in a parallel plane, which may be disposed on the rear, for instance, will also be evaluated in such a manner that the direction of movement of the disturbance is detected and the detection is utilized to initiate appropriate opening or closing movements of the door. For instance, the left-hand wing can be closed in response to an approach toward the right-hand door from the inside and the right-hand wing can be closed in response to an approach toward the left-hand gate from the outside.

I claim:

1. A shutter door assembly comprising at least one high speed shutter door and an apparatus for controlling the opening and/or closing of the high speed shutter door, said apparatus comprising means for detecting the presence of an object in a space adjacent the door including a plurality of transmitters position on one side of said space, at least one receiver and a control circuit, said receiver being positioned on a side of said space opposite said transmitters to receive signals from said transmitters, said receiver and all transmitters being arranged to define a triangular area and being connected to said control circuit, said control circuit being operable to deliver signals to said transmitters in alteration where the signals are converted to radiant energy signals for transmission toward said receiver and, when received by said receiver, are delivered by said receiver to said control circuit, which is adapted to generate an evaluation signal, said alteration of transmitted signals being controlled by a clock signal generated by a clock circuit in said control circuit, said control circuit including a frequency evaluating circuit to which said signals are delivered, and said evaluation circuit including a comparator circuit which compares the signals delivered by said receiver to said evaluating circuit and the signals delivered to the transmitters relative to the frequency of said signals and which, in case of a deviation in frequency between a transmitted signal and a received signal, generates a switching signal for controlling movement of the high speed shutter door.

2. Apparatus according to claim 1 characterized in the the control circuit delivers signals to the transmitters in a cyclic sequence.

3. Apparatus according to claim 1 further comprising a fail-safe circuit for monitoring the functions of all transmitter, receiver and control circuit subassemblies.

4. Apparatus according to claim 1 characterized in that the geometry of the space is completely covered by the transmitter-receiver planes of a plurality of arrays of transmitters and receivers.

5. Apparatus according to claim 1 characterized in that a common control circuit is associated with a plurality of arrays consisting each of transmitters and a receiver.

6. Apparatus according to claim 1 characterized in that the transmitters comprise light-emitting diodes and the receiver comprises a photodetector.

7. Apparatus according to claim 1 characterized in that at least two receivers are provided and a plurality of transmitters are associated with and disposed opposite to and spaced from each receiver.

8. Apparatus according to claim 1, characterized in that the transmitters are arranged along a bar which is mounted on one side of the door or on one side of the door opening.

9. Apparatus according to claim 5 characterized in that the transmitters of each array and/or of all arrays are activated by a transmitter controller.

10. Apparatus according to claim 6 characterized in that the light emitting diodes have a divergence angle of at least 20 degrees.

11. Apparatus according to claim 6 characterized in that the light emitting diodes consist of infrared-emitting diodes and the photodetector element consists of an infrared detector.

12. Apparatus according to claim 7 characterized in that the transmitters are arranged in line.

13. Apparatus according to claim 7 characterized in that a second receiver-transmitter array is so arranged that the receivers are disposed on opposite sides of a space.

14. Apparatus according to claim 13 characterized in that the receivers are diagonally opposite to each other.

15. Apparatus according to claim 13 characterized in that each receiver and the associated transmitters define the area of a right triangle.

16. Apparatus according to claim 8, characterized in that the bar is mounted on the free end edge of the high-speed shutter door.

17. Apparatus according to claim 8, characterized in that the bar is mounted at the bottom edge of at least one door, preferably on that wing of the door which reaches the center of the door opening.

18. Apparatus according to claim 8, characterized in that vertical bars are provided adjacent to the jambs of the door.

19. Apparatus according to claim 8, characterized in that the receiver is provided on the door or at the door opening on a side thereof which is opposite to the transmitter.

20. Apparatus according to claim 8, characterized in that bars are provided which are mounted on the walls defining the door opening or which extend from said walls at right angles thereto.

21. Apparatus according to claim 19, characterized in that the receiver is mounted on a transmitter bar which is associated with a second array, the receiver of which is disposed opposite to the receiver of the first array.

22. Apparatus according to claim 20, characterized in that the bars extend away from the walls at least in a length which corresponds to the largest width of a door.

23. Apparatus according to claim 20, characterized in that the bars extend away from the walls at least on a length which corresponds to the largest width of a door.

24. A shutter door assembly comprising at least one high speed shutter door and an apparatus for controlling the opening and/or closing of the high speed shutter door, said apparatus comprising means for detecting the presence of an object in a space adjacent the door, including a plurality of transmitters position on one side of said space, at least one receiver and a control circuit, said receiver being positioned on a side of said space opposite said transmitters to receive signals from said transmitters, said receiver and all transmitters being arranged to define a triangular area and being connected to said control circuit, said control circuit being operable to deliver signals to said transmitters in alteration where the signals are converted to radiant energy signals for transmission toward said receiver and, when received by said receiver, are delivered by said receiver to said control circuit, which is adapted to generate an evaluation signal, said alteration of transmitted signals being controlled by a clock signal generated by a clock circuit in said control circuit, said control circuit including an amplitude evaluating circuit to which said signals are delivered, and said evaluation circuit including a comparator circuit which compares the signals delivered by said receiver to said evaluating circuit and the signals delivered to the transmitters relative to the amplitude of said signals and which, in case of a deviation in amplitude between a transmitted signal and a received signal, generates a switching signal for controlling movement of the high speed shutter door.

25. Apparatus according to claim 24 characterized in that the control circuit delivers signals to the transmitters in a cyclic sequence.

26. Apparatus according to claim 24 further comprising a fail-safe circuit for monitoring the functions of all transmitter, receiver and control circuit subassemblies.

27. Apparatus according to claim 24 characterized in that the geometry of the space is completely covered by the transmitter-receiver planes of a plurality of arrays of transmitters and receivers.

28. Apparatus according to claim 24 characterized in that the transmitters comprise light-emitting diodes and the receiver comprises a photodetector.

29. Apparatus according to claim 24 characterized in that the light emitting diodes consist of infrared-emitting diodes and the photodetector element consists of an infrared detector.

30. Apparatus according to claim 24 characterized in that a common control circuit is associated with a plurality of arrays consisting each of transmitters and a receiver.

31. Apparatus according to claim 24 characterized in that at least two receivers are provided and a plurality of transmitters are associated with and disposed opposite to and spaced from each receiver.

32. Apparatus according to claim 24 characterized in that the transmitters are arranged along a bar which is mounted on one side of the door or on one side of the door opening.

33. Apparatus according to claim 29 characterized in that the light emitting diodes have a divergence angle of at least 20 degrees.

34. Apparatus according to claim 30 characterized in that the transmitters of each array and/or of all arrays are activated by a transmitter controller.

35. Apparatus according to claim 31 characterized in that a second receiver-transmitter array is so arranged that the receivers are disposed on opposite sides of a space.

36. Apparatus according to claim 31 characterized in that the transmitters are in line.

37. Apparatus according to claim 35 characterized in that each receiver and the associated transmitter define the area of a right triangle.

38. Apparatus according to claim 35 characterized in that the receives are diagonally opposite to each other.

39. Apparatus according to claim 32 characterized in that the bar is mounted on the free end edge of the high speed shutter door.

40. Apparatus according to claim 32 characterized in that the bar is mounted at the bottom edge of at least one door, preferably on that wing of the door which reaches the center of the door opening.

41. Apparatus according to claim 32 characterized in that vertical bar are provided adjacent to the jambs of the door.

42. Apparatus according to claim 32 characterized in that the receiver is provided on the door or at the door opening on a side thereof which is opposite to the transmitter.

43. Apparatus according to claim 32 characterized in that several bars are provided which are mounted on the walls defining the door opening or which extend from the walls at right angles thereto.

44. Apparatus according to claim 42 characterized in that the receiver is mounted on a transmitter bar which is associated with a second array, the receiver of which is disposed opposite to the receiver of the first array.

45. Apparatus according to claim 43 characterized in that the bars extend away from the walls at least one a length which corresponds to the largest width of a door.

46. Apparatus according to claim 43 characterized in that the bars are provided adjacent to the floor.

* * * * *